United States Patent [19]

Gonneaud

[11] Patent Number: 5,454,299
[45] Date of Patent: Oct. 3, 1995

[54] FOOD PROCESSOR

[75] Inventor: Patrick Gonneaud, St. Vallier, France

[73] Assignee: Robot-Coupe SNC, France

[21] Appl. No.: 236,354

[22] Filed: Apr. 29, 1994

[30] Foreign Application Priority Data

Apr. 30, 1993 [FR] France .................................. 93 05132

[51] Int. Cl.[6] .......................... A23N 1/00; A47J 43/046; A47J 43/07; B02C 18/16
[52] U.S. Cl. ................... 99/492; 99/510; 241/37.5; 241/92
[58] Field of Search .................. 99/492, 337, 501–505, 99/509–513; 241/37.5, 92, 282.1, 282.2, 280, 36; 361/203; 83/355, 356.3; 16/257

[56] References Cited

U.S. PATENT DOCUMENTS

| | | | |
|---|---|---|---|
| 3,892,365 | 7/1975 | Verdun | 241/92 |
| 4,216,917 | 8/1980 | Clare et al. | 241/37.5 |
| 4,240,338 | 12/1980 | McClean | 99/501 |
| 4,448,100 | 5/1984 | Breeden | 83/355 |
| 4,506,836 | 3/1985 | Williams | 241/92 |
| 4,523,720 | 6/1985 | Behringer et al. | 241/282.1 |
| 4,614,306 | 9/1986 | Doggett | 16/257 |
| 4,629,131 | 12/1986 | Podell | 241/36 |
| 4,741,482 | 5/1988 | Coggiola et al. | 241/37.5 |
| 4,799,626 | 1/1989 | Hickel et al. | 99/492 |
| 4,824,029 | 4/1989 | Stottmann et al. | 241/92 |
| 5,037,033 | 8/1991 | Stottmann et al. | 241/37.5 |
| 5,355,784 | 10/1994 | Franklin et al. | 99/492 |

FOREIGN PATENT DOCUMENTS

2498438  7/1982  France .

*Primary Examiner*—Timothy F. Simone
*Attorney, Agent, or Firm*—Eckert Seamans Cherin & Mellott

[57] ABSTRACT

A food processor has a base and a bowl. The base is arranged to couple with the bowl such that the bowl is held from moving in vertical translation by lugs fixed on the base co-operating with corresponding parts of the bowl. The bowl and base are formed with a cooperating abutment and abutment surface, respectively, which are alignable to abut and prevent the bowl from rotating relative the base.

3 Claims, 3 Drawing Sheets

FOOD PROCESSOR

BACKGROUND OF THE INVENTION

1. Field of the Invention

The present invention relates to a food processor for preparing foodstuffs.

2. Prior Art

Such appliances are known, and they enable various attachments such as chopping blades, grating and shredding disks, liquidizers, etc. to be mounted inside a bowl, the attachments being rotated inside the bowl by an electric motor disposed in a base and having its shaft projecting into the bowl.

In certain household food processors, such as the one described in U.S. Pat. No. 3,892,365 (Verdun), the motor is housed in a base, with the bowl being mounted on the base and therefore above the motor. The bottom of the bowl surrounds a base plate provided with lugs which are inserted into grooves when the bowl is mounted on the base, so that the bowl is held stationary in a determined position on the base.

It is essential for consumer appliances to be provided with safety means designed to prevent injuries to users. In the above-mentioned patent, such safety means are obtained by a safety rod which enables the appliance to operate, i.e. which enables the motor to be started, only when the bowl is properly attached to the base, and when the lid closing the bowl is in the closed position. In this way, it is impossible for there to be any contact between the hands of the user and an attachment that is rotating. In that known device, the push-rod, which is vertically movable under the action of a spring and of a cam provided on the lid, extends along a channel formed along a generator line of the cylindrical bowl, the spring being mounted in the bottom portion of said channel.

The bowl stands on its bottom on a base plate projecting from the top surface of the base. The bowl has a skirt which surrounds the base plate. Said skirt is provided with grooves (in practice, there are three such grooves) in which lugs are inserted, thereby constituting a bayonet locking system.

That locking system performs the following functions:

it centers the bowl relative to the base;

it locks the bowl in position vertically; and it prevents the bowl from rotating.

Naturally, however, only a bowl that has dimensions corresponding to those of the base can be mounted thereon. Depending on the type of preparation, it is convenient to be able to use bowls having various capacities. Moreover, that locking system requires the presence of a base plate, and this may be a drawback.

It has already been proposed in Document FR-A-2 498 438 to use the sleeve surrounding the drive shaft to fasten the bowl, said sleeve being provided with notches which receive lugs that are formed in the central chimney of the bowl. Unfortunately, any forces that are exerted at the periphery of the bowl are multiplied in the central portion thereof by leverage, and this means that the fastening system is unsecure.

OBJECTS AND SUMMARY OF THE INVENTION

An object of the present invention is to mitigate that drawback, and to enable bowls of different sizes to be mounted on the same base.

The present invention provides a food processor including a base on which a bowl is mounted, the bowl being closed by a lid and having a central chimney, it being possible to drive various attachments inside the bowl via a drive shaft that projects through the bottom of the bowl inside the central chimney, means for providing safe operation being constituted by the presence of a push-rod which comes into contact with a switch when the lid is locked on the bowl; wherein the bowl is centered on the base by means of mutual cylindrical engagement between the central chimney and a sleeve surrounding the drive shaft, the chimney in the bowl being held in position vertically by means of studs inside the chimney bearing against lugs projecting from the sleeve of the drive shaft, an eccentric abutment preventing the bowl from rotating, the studs and the lugs being horizontal.

Whereas, in the prior art, the bowl is locked at its periphery by bayonet fastening means which also performed the functions of centering and of preventing rotation and vertical translation, in the present Application, the three functions are differentiated:

centering is performed by mutual cylindrical engagement between the chimney in the bowl and the sleeve surrounding the drive means;

the bowl is prevented from being pulled off vertically by the stud-lug assembly; the bowl can thus rotate about the sleeve of the drive shaft; and the bowl is prevented from being rotated by an eccentric abutment; the eccentric abutment enables the bowl to be locked angularly in a determined position that corresponds to the position of the push-rod when it is in alignment with a hole provided in the base so as to enable said push-rod to act on a safety switch.

The eccentric abutment may be disposed on the central sleeve, or on the base plate, when the base has a base plate, or else it may consist of a radial stop projecting from the surface of the base. Naturally, the abutment corresponds to an abutment surface provided either on the bowl or on the handle.

BRIEF DESCRIPTION OF THE DRAWINGS

Other characteristics and advantages of the invention will appear on reading the following description of particular embodiments, given merely by way of non-limiting example, with reference to the accompanying drawings showing parts of a food processor provided with a base plate, in which drawings.

DETAILED DESCRIPTION OF THE PREFERRED EMBODIMENTS

Figure 1:
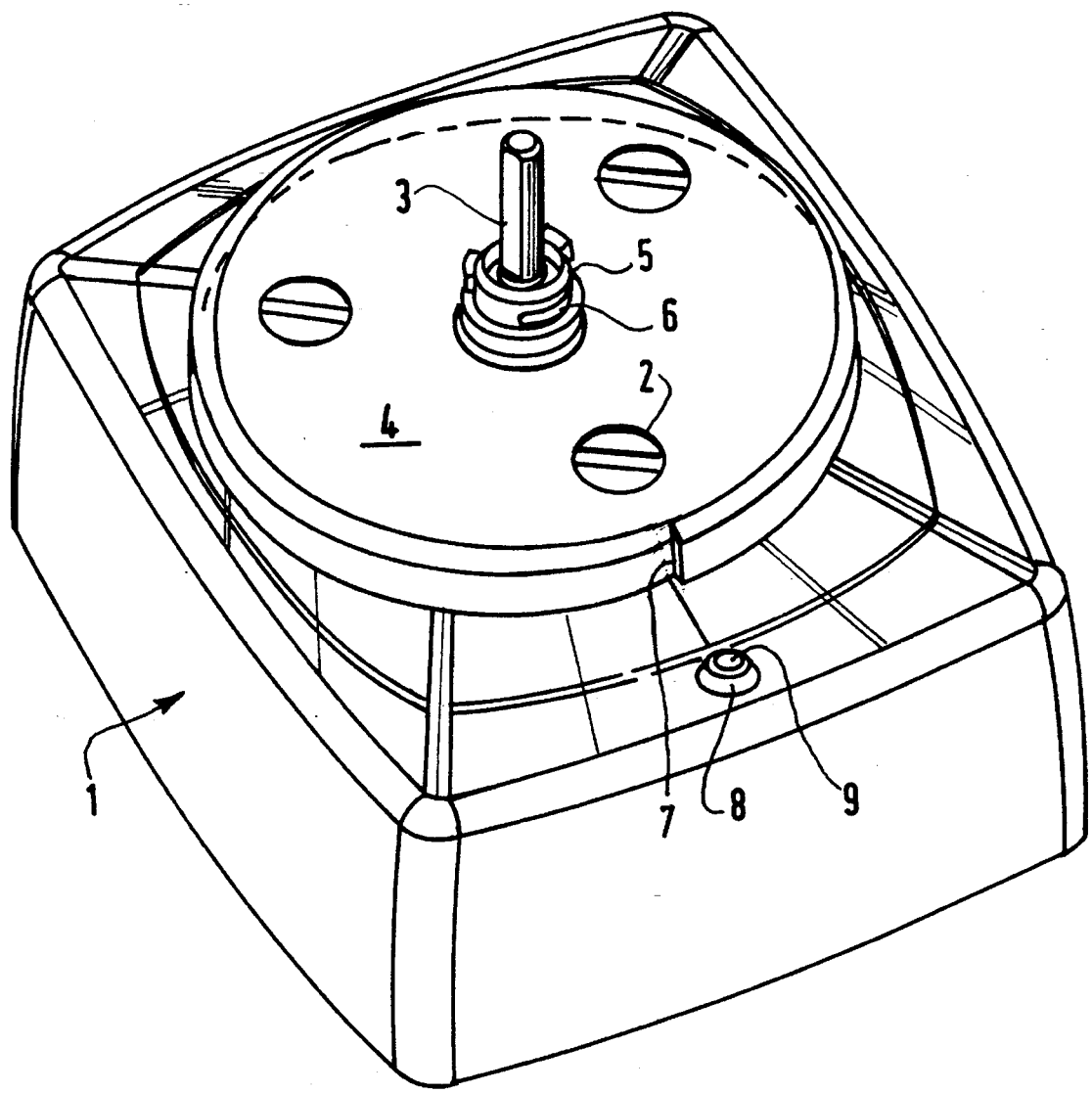
FIG. 1 is a perspective view showing the base of a food processor of the invention.

FIG. 1 shows a base 1 having the overall shape of a rectangular block. The base includes a motor (not shown) held by screws 2 and having a drive shaft 3 projecting above the top surface of the base plate 4 on the base. When the bowl is mounted on the base, the shaft 3 projects into said bowl. The shaft 3 is surrounded by a sleeve 5 which, after it has been inserted into the bowl, is surrounded by a chimney designed to provide sealing. FIG. 1 also shows a tapering projection 8 projecting from the top surface of the base or shell 1. A piston 9 is mounted inside the projection, with only the top surface of the piston being visible in FIG. 1. The resulting assembly 8, 9 constitutes the control for the safety switch.

Figure 2:
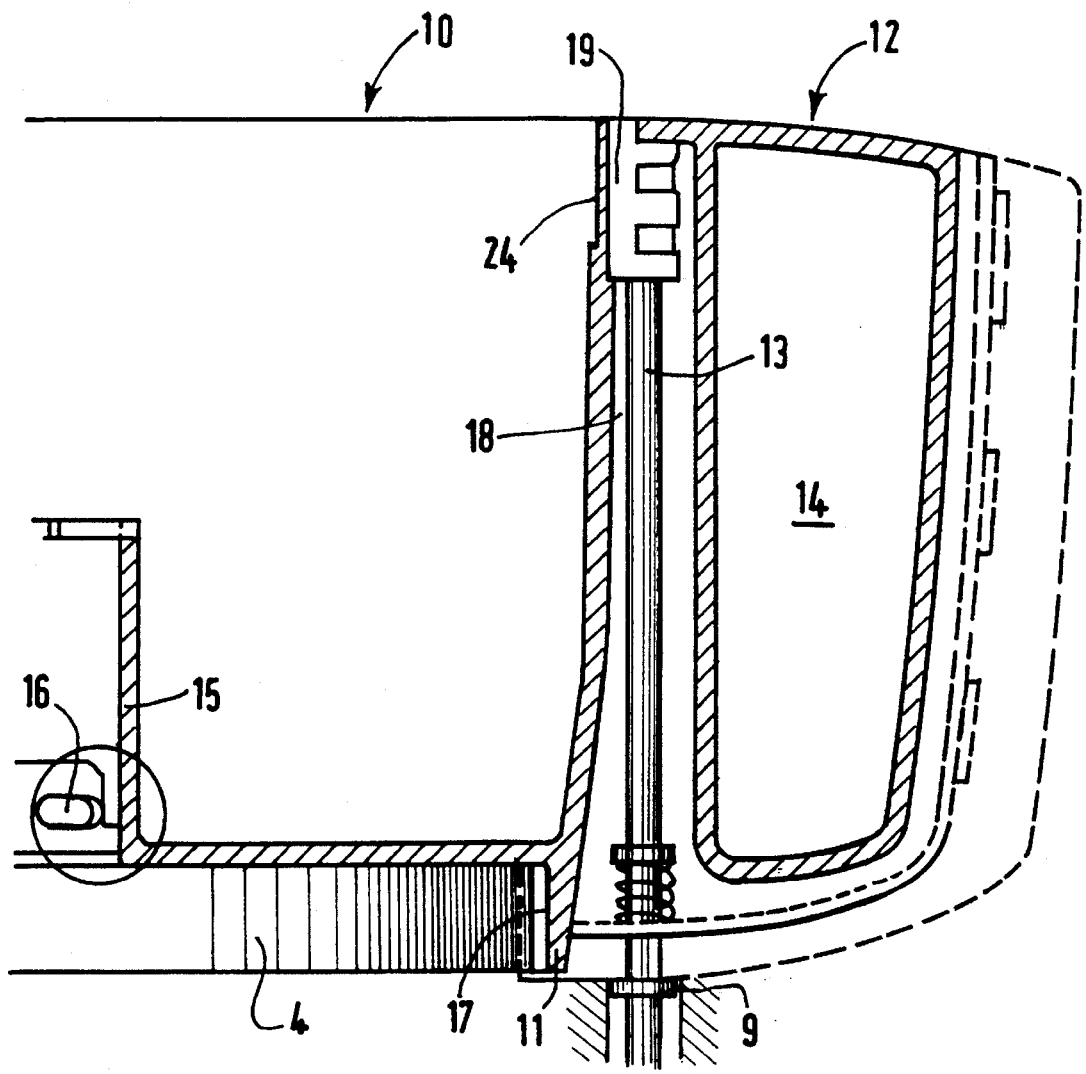
FIG. 2 is a fragmentary view of the bowl and of the handle.

FIG. 2 is a half-section view showing the bowl 10 and the handle that is integrated therewith, the section being taken on a plane passing through the handle. The handle 12 encloses all of the elements with a safety function, namely essentially the push-rod 13, the spring and the guide means therefor. In the example shown, the bottom of the bowl 10 ends in a skirt 11 which surrounds the base plate 4. The handle 12 also receives a covering (not shown). Insofar as the piston 9 is distant from the center of the base, and is almost on one edge thereof, the push-rod 13 is housed in the handle 12 rather than in a channel provided in the bowl, said handle being molded with the bowl 10. Naturally, the handle 12 has a hollow portion 14 so that fingers can pass therethrough. Inside the central chimney 15 studs 16 can be seen which, once the bowl is installed, are situated at a lower level than the lugs 6. The lugs 6 are designed to hold the bowl 10 in a determined vertical position on the base, and to resist any forces tending to raise the bowl. In practice, once the bowl has been slid over the sleeve 5, the bowl needs to be rotated through only a very small angle to cause the studs 16 to become engaged under the lugs 6, thereby preventing the bowl from being moved in vertical translation. However, it can be rotated about the sleeve 5.

As indicated above, the bowl abutment 17 comes into contact with the abutment surface 7 so as to prevent the bowl from rotating by stopping it in a position in which the channel 18 containing push-rod 13 is aligned with the piston 9 so that the push-rod 13 can push the piston down.

Figure 3:
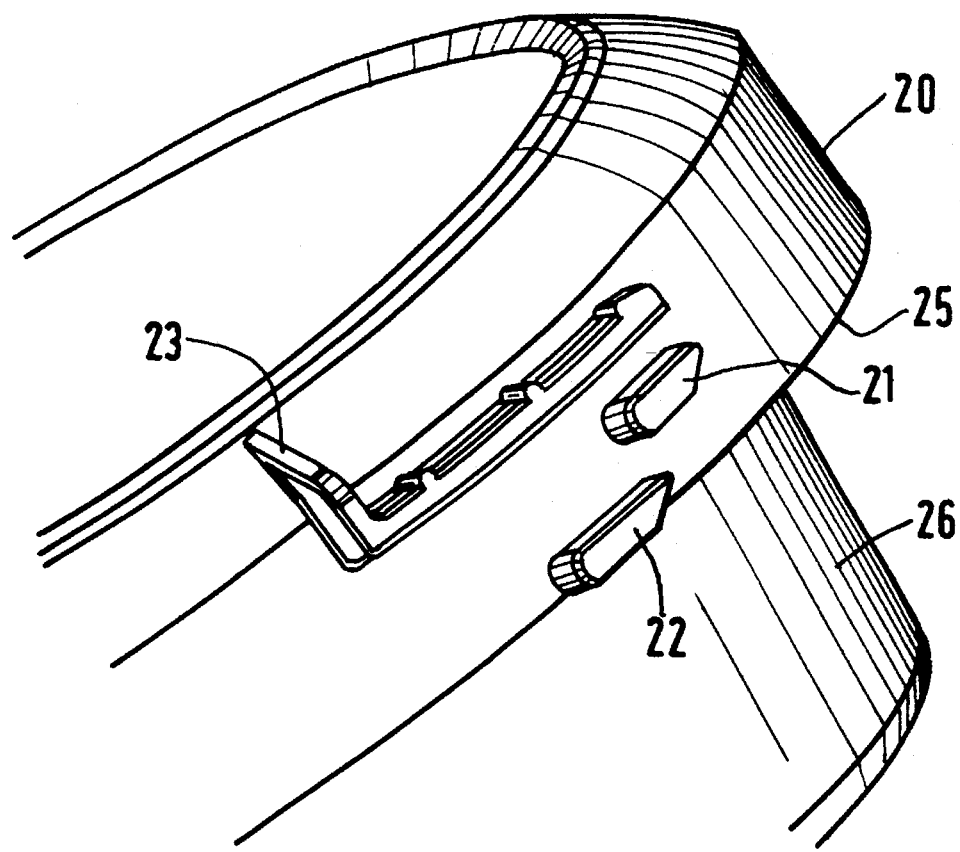
FIG. 3 is a view of the top portion of the lid.

The movement of the push-rod 13 is itself controlled by a cam which is shown in perspective in FIG. 3. The opening for receiving the cam is, as is known per se, provided with wards like a keyhole 19 so as to prevent any non-corresponding objects from being inserted therein and pressed against the push-rod 13.

As shown in FIG. 3, the cam provided on the lid 20 is formed of two discontinuous elements 21 and 22 which press successively on the top of the push-rod 13 while the lid 20 is being rotated closed on the bowl 10. An abutment surface 23 comes into abutment against the handle so as to limit the rotation of the lid 20.

FIG. 2 shows that the top portion of the bowl 10 is provided with a recess 24 in which the rim 25 of the lid 20 is received, the skirt 26 of the lid being inserted into the bowl 10. In this way, not only is good sealing obtained, but also a compact shape is obtained with no ridges projecting from the lid.

Figure 4:
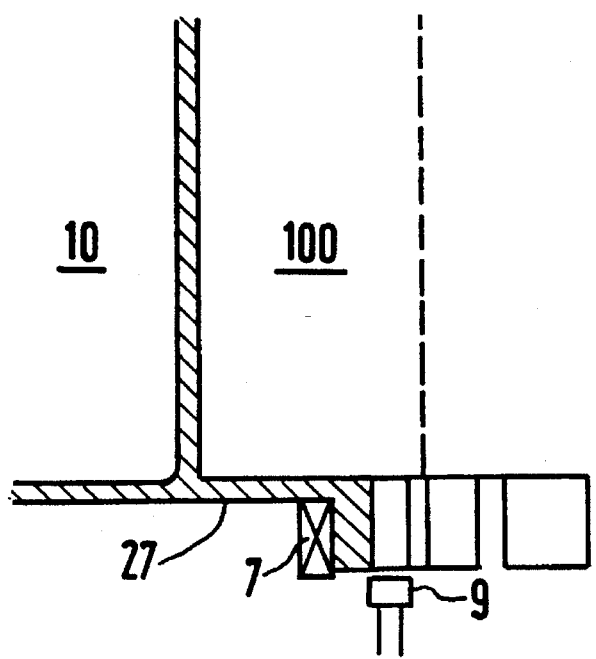
FIG. 4 is a diagram showing how bowls of different capacities may be mounted on the base.

FIG. 4 is a diagram showing how bowls of different diameters can be mounted on the same base. Naturally, the central installation system remains the same, and the bowl is held in position vertically regardless of its diameter and of its height. The diagram shows the outline in the plane of the abutment 7 of a small-capacity bowl 10, and, in dashed lines, the outline of a larger-capacity and therefore larger diameter bowl 100. All the bowls that can be installed must have respective abutment surfaces that come into abutment against the abutment 7, and respective push rods 13 that come into alignment with the piston 9, the corresponding distances constituting unchanging design dimensions.

In the case of the "small" bowl 10, the diameter of the bowl proper is less than that of the base plate 4. To obtain the desired design dimensions, it is then necessary merely to provide an arm 27 carrying the abutment surface, or to increase both the diameter of the skirt 11 and also the size of the handle. Bowl 100 comes accurately into place relative to the abutment surfaces and to the piston 9.

Naturally, without going beyond the ambit of the invention, numerous variants may be made, in particular by replacing the above-described technical means with equivalent means.

I claim:

1. A food processor comprising:

a base;

a drive shaft and a sleeve attached to the base, the sleeve extending out from the base and partly surrounding the drive shaft, the drive shaft extending partly out from the sleeve and base combined;

a bowl having a handle and a bottom formed with a central chimney, the central chimney being shaped for removable installation around the sleeve such that the bowl is centered on the base by mutual cylindrical engagement between the chimney and sleeve, and, the central chimney being arranged to such that the drive shaft can project therethrough to permit the drive shaft to couple with and drive various attachments inside the bowl;

a lid that releasably positionable in a locked position on the bowl, the lid including at least one rod-contacting element; and, safety means for providing safe operation of the food processor, the safety means comprising a switch mounted to the base and a push-rod disposed in the handle of the bowl, the push rod having spaced ends being aligned relative the switch and rod-contacting element of the lid respectively such that the push rod actuates the switch in response to the lid being positioned in the locked position on the bowl;

the bowl including a peripheral abutment and the base including a corresponding contact surface, the peripheral abutment and contact surface being alignable to abut each other and thereby prevent relative rotation between the bowl and base;

wherein the sleeve is provided with horizontal lugs, and an inside of the central chimney of the bowl is provided with studs, which studs are arranged and positioned on the central chimney such that, after the bowl has been installed on the base, said studs are situated above said lugs so as to prevent the bowl from moving in vertical translation.

2. A food processor according to claim 1, wherein, the bowl includes a base plate sized to overlay a top surface of the base, and wherein the peripheral abutment is formed radially on a periphery of the base plate.

3. A food processor according to claim 1, wherein the rod-contacting element of the lid comprises two discontinuous elements.

* * * * *